United States Patent

Baycura

[15] 3,644,822
[45] Feb. 22, 1972

[54] VARIABLE POSITION MULTIELEMENT CAPACITOR VOLTAGE TRANSFORMER DEVICE

[72] Inventor: Orestes M. Baycura, 2238 Central Park Drive, Campbell, Calif. 95008

[22] Filed: Dec. 23, 1970

[21] Appl. No.: 100,946

[52] U.S. Cl. .................. 323/93, 317/249 R, 332/30
[51] Int. Cl. .................. G05f 3/04, H03c 3/20
[58] Field of Search .................. 317/249 R; 323/74, 93

[56] References Cited

UNITED STATES PATENTS

| | | | |
|---|---|---|---|
| 3,242,399 | 3/1966 | Frisch | 317/249 R |
| 2,589,351 | 3/1952 | Ehrlich | 317/249 R |
| 2,847,640 | 8/1958 | Pihl | 323/93 X |
| 2,744,220 | 5/1956 | Matteson | 317/249 R |
| 3,084,558 | 4/1963 | Wilcox et al. | 317/249 R |

*Primary Examiner*—A. D. Pellinen
*Attorney*—R. S. Sciascia and Charles D. B. Curry

[57] ABSTRACT

A multielement capacitor circuit for providing frequency mixing and voltage stepdown functions. One embodiment comprises a three element capacitor circuit where a first AC input signal is applied to the two outer capacitor plates and a second AC input signal is applied to the center capacitor plate and to one of the outer capacitor plates. Also, load resistors may be placed in series with the two input signals or in parallel with the second AC input signal. A variable voltage stepdown function is obtained across only one of the load resistors by physically changing the spacing of the center capacitor plate with respect to the two outer capacitor plates. The mixed frequency signal is obtained across any one of the load resistors. Another embodiment comprises a four element capacitor circuit.

4 Claims, 4 Drawing Figures

PATENTED FEB 22 1972　　　　　　　　　　　　　3,644,822
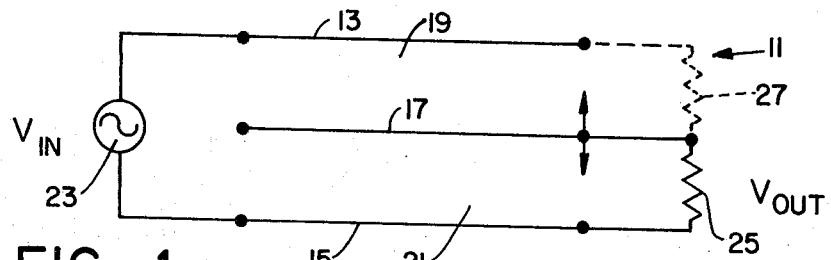
FIG_1
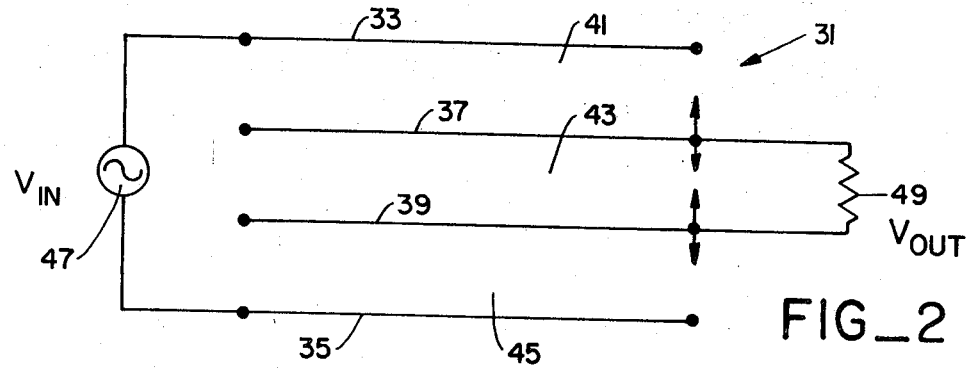
FIG_2
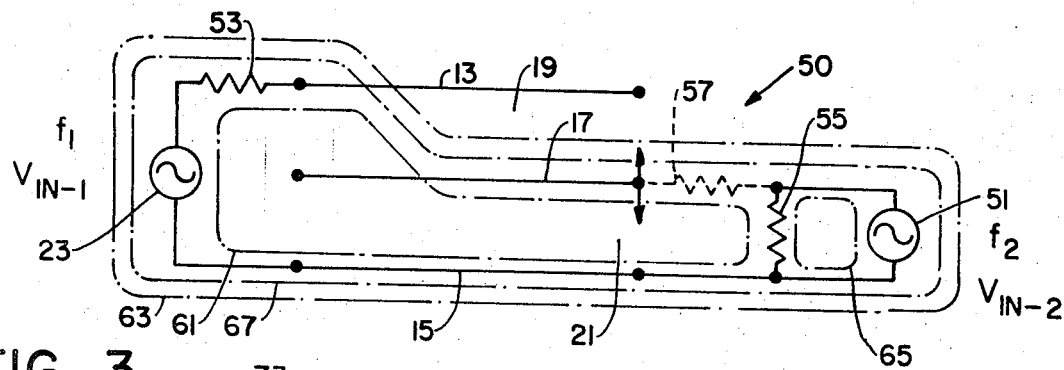
FIG_3
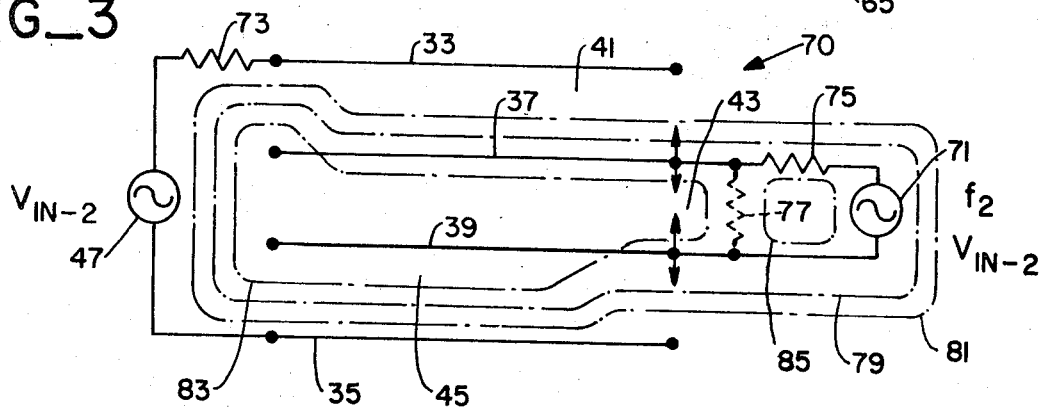
FIG_4
INVENTOR.
ORESTES M. BAYCURA
BY
Charles D.S. Curry
ATTORNEY

VARIABLE POSITION MULTIELEMENT CAPACITOR VOLTAGE TRANSFORMER DEVICE

The invention described herein may be manufactured and used by or for the Government of the United States of America for governmental purposes without the payment of any royalties thereon or therefor.

The present invention relates to a frequency mixing and voltage stepdown device and more particularly to a multielement capacitor for providing frequency mixing and voltage stepdown.

Previous methods used for AC voltage stepdown have been with transformer-type devices. The disadvantage of transformer-type devices is that they are bulky and relatively expensive to construct. Moreover, in many applications the transformer is unable to process small voltages because the volts per turn produced at the secondary for the single turn output is higher than required. In information carrying circuits it is often required to modulate the amplitude of a carrier frequency to affect a transmission of the information in radio wave or in wire circuits. In low-power circuits, modulation or mixing was effected by transistors and in high-power circuits by bulky vacuum tubes or iron-cored transformers. As a result, size, cost and reliability are impediments to many modulation or mixing circuits.

The present invention overcomes these difficulties by providing a multielement capacitor circuit that is capable of providing an AC stepdown voltage and frequency mixing.

Accordingly, an object of the present invention is to provide a simple, inexpensive and reliable multielement capacitor circuit for providing AC voltage stepdown and frequency mixing.

Briefly, the present invention comprises a multielement capacitor circuit for providing frequency mixing and voltage stepdown functions. One embodiment comprises a three element capacitor circuit where a first AC input signal is applied to the two outer capacitor plates and a second AC input signal is applied to the center capacitor plate and to one of the outer capacitor plates. Also, load resistors may be placed in series with the two input signals or in parallel with the second AC input signal. A variable voltage stepdown function is obtained across only one of the load resistors by physically changing the spacing of the center capacitor plate with respect to the two outer capacitor plates. The mixed frequency signal is obtained across any one of the load resistors. Another embodiment comprises a four element capacitor circuit.

Other objects, advantages and novel features of the invention will become apparent from the following detailed description of the invention when considered in conjunction with the accompanying drawings wherein:

FIG. 1 is a schematic drawing of a three-element capacitor transformer of the present invention;

FIG. 2 is a schematic drawing of a four-element capacitor transformer where the input is isolated from the output;

FIG. 3 is a schematic drawing of a three-element capacitor transformer that provides both a stepdown voltage and mixing of two input signals; and FIG. 4 is a schematic drawing of a four-element capacitor transformer that provides both a stepdown voltage and mixing of two input signals.

In FIG. 1 is illustrated a three-element capacitor transformer 11 of the present invention. Capacitor transformer 11 comprises a pair of outside plates 13 and 15 and center plate 17. Outside plates 13 and 15 and center plate 17 may be made of flat thin conducting material. Space 19, between plates 13 and 17, and space 21, between plates 15 and 17 are insulating regions comprising air or other nonconducting material. An input voltage generator 23 is connected across plates 13 and 15 having a signal $V_{IN}$. The output signal $V_{OUT}$ is taken across load resistor 25 which is connected across plates 15 and 17. Alternatively, the output signal may be taken across load resistor 27 (shown in dotted lines) which is connected across plates 13 and 17. The arrows attached to center plate 17 of FIG. 1 indicate that plate 17 may be moved towards either plate 13 or plate 15. Since the output voltage $V_{OUT}$ across load resistor 25 varies inversely with the distance between plate 17 and 13 the output voltage $E_{OUT}$ may be selected from between zero to the input voltage $E_{IN}$ by positioning plate 17. When plate 17 is centered between plates 13 and 15 the output voltage $E_{OUT}$ is one-half the input voltage $E_{IN}$.

The input and output voltage devices may be interchanged. If the input voltage $E_{IN}$ and the output voltage $E_{OUT}$ are interchanged, then a lower voltage will appear between plates 13 and 15. Also, the magnitude of the reduced output voltage can be changed by positioning the center plate 17.

In FIG. 2 is illustrated another embodiment of the capacitor transformer 31 of the present invention. This is a four-element capacitor that permits isolation of the input from the output. Capacitor transformer 31 comprises a pair of outside plates 33 and 35 and a pair of center plates 37 and 39. Outside plates 33 and 35 and center plates 37 and 39 may be made of flat thin conducting material. Space 41, between plates 33 and 37, space 43, between plates 37 and 39 and space 45, between plates 35 and 39, are insulating regions comprising air or other nonconducting material. An input voltage generator 47 is connected across plates 33 and 35 having a signal $V_{IN}$. The output signal $V_{OUT}$ is taken across load resistor 49 which is connected across plates 37 and 39. In this embodiment the spacing between plates 37 and 39 governs the output voltage. The arrows attached to center plates 37 and 39 indicate that plate 37 may be moved toward or away from plate 33 and that plate 39 may be moved toward or away from plate 35. Preferably, plates 37 and 39 are moved simultaneously such that they are respectively equal distances from plates 33 and 35. Since the output voltage $V_{OUT}$ across resistor 49 varies inversely with the distance that plate 37 is from plate 33 and plate 39 is from plate 35, the output voltage may be selected from between zero to the input voltage $E_{IN}$ by positioning plates 37 and 39. That is, as the space between center plates 37 and 39 is increased the output voltage $V_{OUT}$ increases until it equals the input voltage $V_{IN}$. It should also be noted that the input and output voltages may be interchanged and still achieve a reduced output voltage.

In FIG. 3 is illustrated a three element capacitor circuit 50 that functions both as a voltage stepdown transformer and as a frequency mixer or modulation device. Equivalent numbers of the FIG. 1 and FIG. 3 circuits represent equivalent elements. The FIG. 3 circuit 50 functions as a voltage stepdown device in the same manner as described with respect to the FIG. 1 circuit and will therefore not be described.

Three element capacitor circuit 50 includes two input voltage generators 23 and 51, load resistors 53 and 55 and an alternative load resistor 57 (indicated by dotted lines) which may be used in addition to or substituted for load resistor 55. Voltage generator 23 generates an input AC voltage $V_{IN-1}$ at a frequency $f_1$ and voltage generator 51 generates an input AC voltage $V_{IN-2}$ at a frequency $f_2$. The signal $V_{IN-1}$ having a frequency $f_1$ is applied to plates 13 and 15 and the signal $V_{IN-2}$ having a frequency $f_2$ is applied to plates 15 and 17. The current path of the $f_1$ signal is illustrated by broken lines 61 and 63 and passes through resistors 53 and 55. The current paths of the $f_2$ signal are illustrated by broken lines 65 and 67. Form this it can be seen that the modulated frequencies (the sum and difference of $f_1$ and $f_2$) appear across both of load resistors 53 and 55. It should be noted that the $f_1$ signal current in path 63 is preferably selected to be less than the $f_1$ signal current in path 61 by selecting the impedance of signal generator 51 to be greater than the impedance of load resistor 55. This provides a stronger signal across load resistor 55.

It is also to be understood that load resistor 57 may be used in addition to or substituted in place of load resistor 55. When load resistor 55 is removed and load resistor 57 is put in place, then current paths 61 and 65 will no longer be present and current paths 63 and 67 will then provide the $f_1$ and $f_2$ signals, respectively, across resistors 53 and 57.

Variable voltage stepdown across load resistor 53, 55 and 57 is achieved by moving plate 17 either towards plate 13 or away from plate 13 is indicated by the arrows.

In FIG. 4 is illustrated a four-element capacitor circuit 70 that functions both as a voltage stepdown transformer and as a frequency mixer or modulation device. Equivalent numbers of the FIG. 2 and 4 circuits represent equivalent elements. The FIG. 4 circuit 70 functions as a voltage stepdown device in the same manner as described with respect to the FIG. 2 circuit and will therefore not be described.

The four-element capacitor circuit 70 includes two input voltage generators 47 and 71, load resistors 73 and 75 and an alternative load resistor 77 (indicated by dotted lines) which may be used in addition to or substituted for load resistor 75. Voltage generator 47 generates an input AC voltage $V_{IN\text{-}1}$ at a frequency $f_1$ and voltage generator 71 generates an input AC voltage $V_{IN\text{-}2}$ at a frequency $f_2$. The signal $V_{IN\text{-}1}$ having a frequency $f_1$ is applied to plates 33 and 35 and the signal $V_{IN\text{-}2}$ having a frequency $f_2$ is applied to plates 37 and 39. The current path for this $f_1$ signal is illustrated by the broken line 79 and passes through load resistors 73 and 75. The current path of the $f_2$ signal is illustrated by broken line 81 and also passes through load resistors 73 and 75. From this it can be seen that the modulation frequencies (the sum and difference of $f_1$ and $f_2$) appear across both of load resistors 73 and 75.

It is to be understood that load resistor 77 may be used in addition to or substituted in place of load resistor 75. When load resistor 77 is added then an $f_1$ current path, as indicated by broken line 83, will pass through load resistor 73 and 77 and $f_2$ current paths, as indicated by broken lines 85 and 81, will pass respectively through load resistors 77 and 73. Therefore, the $f_1$ and $f_2$ signals will appear across each of load resistors 73 and 77 thereby resulting in the modulated signals being available across either of these load resistors.

Variable voltage stepdown across load resistors 73, 75 and 77 is achieved by moving plates 37 and 39 either closer together or further apart as indicated by the arrows.

Demodulation of the FIG. 3 and FIG. 4 circuits can be readily effected. For example, in the FIG. 4 circuit the antenna carrying the modulating wave $(f_1$ and $f_2)$ is applied to plates 33 and 35 and the demodulating frequency $f_3$ is applied to plates 37 and 39. The intermediate frequency $(f_1 + f_2 \pm f_3)$ then appears across resistors 73 (or 75) and is then further amplified for reproduction of the intelligence contained in the input wave $(f_1 + f_2)$.

In view of the foregoing it can be seen that when operating in the transformer mode any varying voltage can be reduced to any value by positioning the output plate closer to one of the input plates. The capacitor voltage reducer is smaller and cheaper than a transformer for voltage reduction. If the output plates are movable, a variable voltage can be obtained by positioning the output plate properly between the two input plates. The higher the input frequencies, the more current can be delivered to the low-voltage plate because the capacitor current is the time derivative of the input voltage. Several output voltages can be available by having more than one output plate. When operating in the capacitor mixer mode there is provided a means of mixing two or more signals linearly by a passive device. The device can demodulate a signal by mixing it with a local oscillator to obtain the intelligence in the signal. The mixing modes provide a linear modulator or demodulator up to the voltage breakdown strength of the dielectric between the plates.

It should also be noted that the capacitor plates need not be flat as shown in FIGS. 1, 2, 3, and 4. The plates could be flexible and rolled into a cylinder to conserve space and produce a larger capacitance and currents by increasing the surface area. In the manually variable capacitor with a movable output plate, the dielectric could be air instead of solid material. For fixed plates, the output voltage could be varied by moving the dielectric into or out of the space between the plates. The higher output occurs when the dielectric is fully covering all the plate surfaces. It should also be noted that modulation of FIGS. 1, 2, 3, and 4 circuits may be also achieved by physically moving the movable plates at different information frequencies.

What is claimed is:
1. A capacitor circuit comprising:
   a. a first outer capacitor plate;
   b. a second outer capacitor plate;
   c. third and fourth spaced-apart capacitor plates positioned between said first and second capacitor plates;
   d. an AC signal source operatively connected to said first and second outer capacitor plates; and
   e. means operatively connected to said third and fourth capacitor plates to provide an output signal.
2. The device of claim 1 wherein:
   a. said means comprises a resistor operatively connecting said third and fourth capacitor plates.
3. The device of claim 1 including:
   a. means for moving said third and fourth capacitor plates with respect to each other and with respect to said first and second capacitor plates.
4. The device of claim 3 wherein:
   a. said first capacitor plate is adjacent to said third capacitor plate and said second capacitor plate is adjacent to said fourth capacitor plate; and
   b. said means simultaneously moves by equal amounts said third capacitor plate towards said first capacitor plate and said fourth capacitor plate towards said second capacitor plate.

* * * * *